United States Patent
Petit et al.

(10) Patent No.: US 12,529,681 B2
(45) Date of Patent: Jan. 20, 2026

(54) PROBE FOR CHECKING THE PRESENCE OF PARAMAGNETIC PARTICLES IN A TANK

(71) Applicant: Airbus Operations SAS, Toulouse (FR)

(72) Inventors: Patrick Petit, Toulouse (FR); Gérard Millet, Toulouse (FR); Thierry Lopez, Toulouse (FR); Alexis Monteil, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 141 days.

(21) Appl. No.: 18/442,222

(22) Filed: Feb. 15, 2024

(65) Prior Publication Data
US 2024/0280537 A1    Aug. 22, 2024

(51) Int. Cl.
*G01N 27/74* (2006.01)
(52) U.S. Cl.
CPC .................. *G01N 27/74* (2013.01)
(58) Field of Classification Search
CPC ............... G01N 27/74; G01N 33/2888; B03C 2201/18; B03C 2201/24; B03C 1/286; G01V 3/08; B65D 25/00
See application file for complete search history.

(56) References Cited

U.S. PATENT DOCUMENTS

| | | | |
|---|---|---|---|
| 2,830,261 A | 4/1958 | Estelle | |
| 4,537,071 A | 8/1985 | Waterman | |
| 5,089,129 A * | 2/1992 | Brigman | B03C 1/288 210/541 |
| 5,465,078 A * | 11/1995 | Jones, Jr. | B03C 1/286 184/6.25 |
| 9,632,072 B1 | 4/2017 | Fitch et al. | |
| 9,957,859 B2 * | 5/2018 | Cohen | F01M 11/0408 |
| 10,539,052 B2 | 1/2020 | Ardes | |
| 2014/0311240 A1 * | 10/2014 | Fitch | G01N 33/30 73/334 |

FOREIGN PATENT DOCUMENTS

CN    113899662 A    1/2022

OTHER PUBLICATIONS

French Search Report for corresponding French Patent Application No. 2301482 dated Nov. 3, 2023.

* cited by examiner

*Primary Examiner* — Giovanni Astacio-Oquendo
*Assistant Examiner* — Haidong Zhang
(74) *Attorney, Agent, or Firm* — Greer, Burns & Crain, Ltd.

(57) ABSTRACT

A probe for use with a tank having a wall pierced by an orifice and configured to contain a fluid containing paramagnetic particles. The probe comprises a magnet, a displacement system arranged at the orifice to displace the magnet from a capturing position in which the magnet is bathed in the fluid to a checking position in which the magnet is outside of the tank, and a seal ensuring the seal-tightness of the orifice in the transition from the capturing position to the checking position and vice versa.

3 Claims, 6 Drawing Sheets

PROBE FOR CHECKING THE PRESENCE OF PARAMAGNETIC PARTICLES IN A TANK

CROSS-REFERENCES TO RELATED APPLICATIONS

This application claims the benefit of French Patent Application Number 2301482 filed on Feb. 17, 2023, the entire disclosure of which is incorporated herein by way of reference.

FIELD OF THE INVENTION

The present invention relates to a probe intended to check the presence of paramagnetic particles in a tank containing a fluid potentially containing these paramagnetic particles and to do so without draining said tank. The present invention also relates to an assembly comprising a tank containing the fluid and such a probe.

BACKGROUND OF THE INVENTION

In mechanical engineering, many moving mechanisms, such as gearboxes and electric generators, are housed in a tank containing a fluid, typically oil, to ensure the lubrication of the mechanism. With the wear of the mechanical parts of which the mechanism is composed, particles torn away from these parts are dispersed in the tank. It is then necessary to purge the tank of its oil to replace it with a new oil.

In the context of aircraft maintenance, this replacement of the oil can be relatively lengthy and costly because of the downtime of the aircraft. It is therefore desirable to find an arrangement which limits the draining needs and which, in addition, makes it possible to know the state of wear of the mechanical parts without draining the oil to optimize the maintenance operations.

SUMMARY OF THE INVENTION

An object of the present invention is to propose a probe for a tank containing a fluid potentially containing paramagnetic particles, in which the probe is intended to check the presence of these paramagnetic particles without entirely draining said tank.

To this end, a probe is proposed that is intended to be used with a tank having a wall pierced by an orifice and in which the tank is intended to contain a fluid containing paramagnetic particles, said probe comprising:
a magnet,
a displacement system intended to be arranged at the orifice and constructed to displace the magnet from a capturing position in which the magnet is bathed in the fluid to a checking position in which the magnet is outside of the tank, wherein the displacement system is constructed to displace the magnet through the orifice from the inside to the outside of the tank and vice versa, and
sealing means intended to ensure the seal-tightness of the orifice in the transition from the capturing position to the checking position and vice versa,
wherein the displacement system takes the form of a screw with a threaded rod and a head, wherein the orifice is a tapped hole into which the threaded rod is screwed, wherein the threaded rod has a recess in which the magnet is fixed and wherein the position of the recess along the threaded rod is such that the magnet is bathed in the fluid in capturing position and is outside of the tank in checking position.

With such an arrangement, it is possible to check the presence of paramagnetic particles without entirely draining the tank, by partial removal of the screw, which also makes it possible to assess the wear of the mechanical parts from which the paramagnetic particles originate.

Advantageously, the sealing means are produced by the threading of the threaded rod and the tapping of the orifice.

Advantageously, the screw is produced in a non-magnetic material.

Advantageously, the recess takes the form of at least one tunnel emerging at each end at the threading of the threaded rod, the or each tunnel has a drain extending along said tunnel, the magnet is housed in the drain at a distance from the threading, and, for each part of a drain extending between the magnet and the threading of the threaded rod, an element produced in a non-magnetic material is housed in said part.

The invention proposes also a probe intended to be used with a tank having a wall pierced by an orifice and in which the tank is intended to contain a fluid containing paramagnetic particles, said probe comprising:
a magnet,
a displacement system intended to be arranged at the orifice and constructed to displace the magnet from a capturing position in which the magnet is bathed in the fluid to a checking position in which the magnet is outside of the tank, and
sealing means intended to ensure the seal-tightness of the orifice in the transition from the capturing position to the checking position and vice versa,
wherein the sealing means comprise:
a first blind cylinder with an open end mounted fixed in the orifice and a blind end intended to dip into the fluid, in which the part of the cylindrical wall of the first blind cylinder which is intended to dip into the fluid is pierced by first passages separated by solid parts of the cylindrical wall of the first blind cylinder, and
a second blind cylinder having an open end disposed at the open end of the first blind cylinder and a blind end disposed against the blind end of the first blind cylinder, in which the second blind cylinder is mounted to be movable in rotation inside the first blind cylinder, in which the cylindrical wall of the second blind cylinder is pierced by second passages separated by solid parts of the cylindrical wall of the second blind cylinder,
in which the first passages and the second passages are disposed in such a way that, in capturing position, a second passage is facing a first passage and in such a way that, in checking position, each second passage is located facing a solid part of the cylindrical wall of the first blind cylinder and each first passage is located facing a solid part of the cylindrical wall of the second blind cylinder,
and the displacement system is a plug which is screwed to the second blind cylinder at its open end and in which the magnet is fixed to a face of the plug oriented towards the inside of the second blind cylinder.

With such an arrangement, it is possible to check the presence of paramagnetic particles without entirely draining the tank by isolating the magnet, which also makes it possible to assess the wear of the mechanical parts from which the paramagnetic particles originate.

Advantageously, for each first passage, the second blind cylinder bears a seal fixed to the solid part of the cylindrical wall of the second blind cylinder which comes to face the first passage in checking position.

The invention also proposes an assembly comprising a tank having a wall pierced by an orifice and in which the tank is intended to contain a fluid containing paramagnetic particles and a probe according to one of the preceding variants, in which the displacement system is arranged at the orifice and constructed to displace the magnet from a capturing position in which the magnet is bathed in the fluid to a checking position in which the magnet is outside of the tank, and in which the sealing means are arranged to ensure the seal-tightness of the orifice in the transition from the capturing position to the checking position and vice versa.

BRIEF DESCRIPTION OF THE DRAWINGS

The features of the invention mentioned above, and others, will become more clearly apparent upon reading the following description of an exemplary embodiment, said description being given in relation to the attached drawings, in which.

DETAILED DESCRIPTION OF THE PREFERRED EMBODIMENTS

Figure 1:
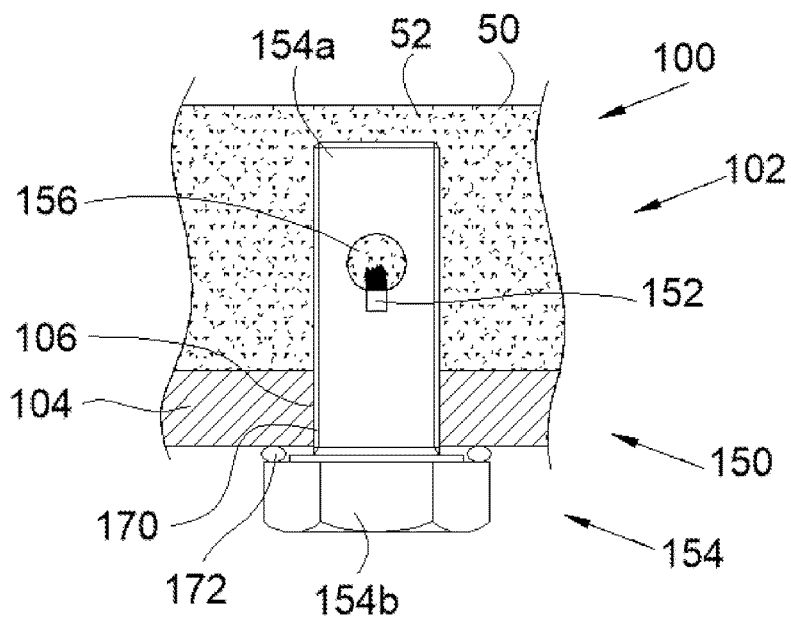
FIG. 1 is a cross-sectional view of an assembly with a probe according to a first embodiment of the invention in a capturing position of the probe.
Figure 2:
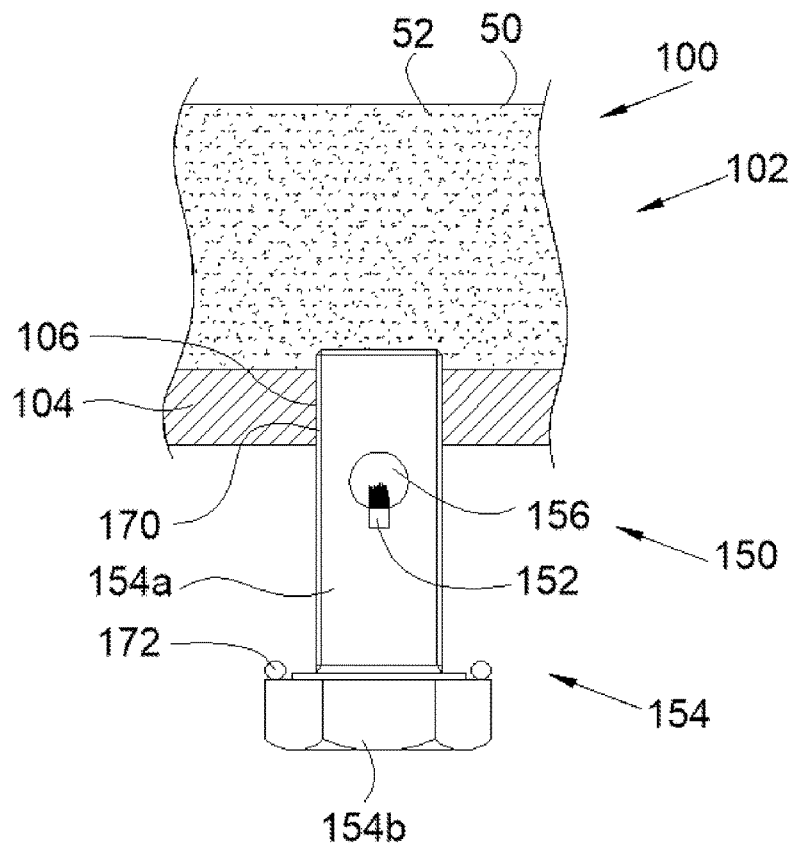
FIG. 2 is a cross-sectional view of the assembly of FIG. 1 in a checking position of the probe.
Figure 3:
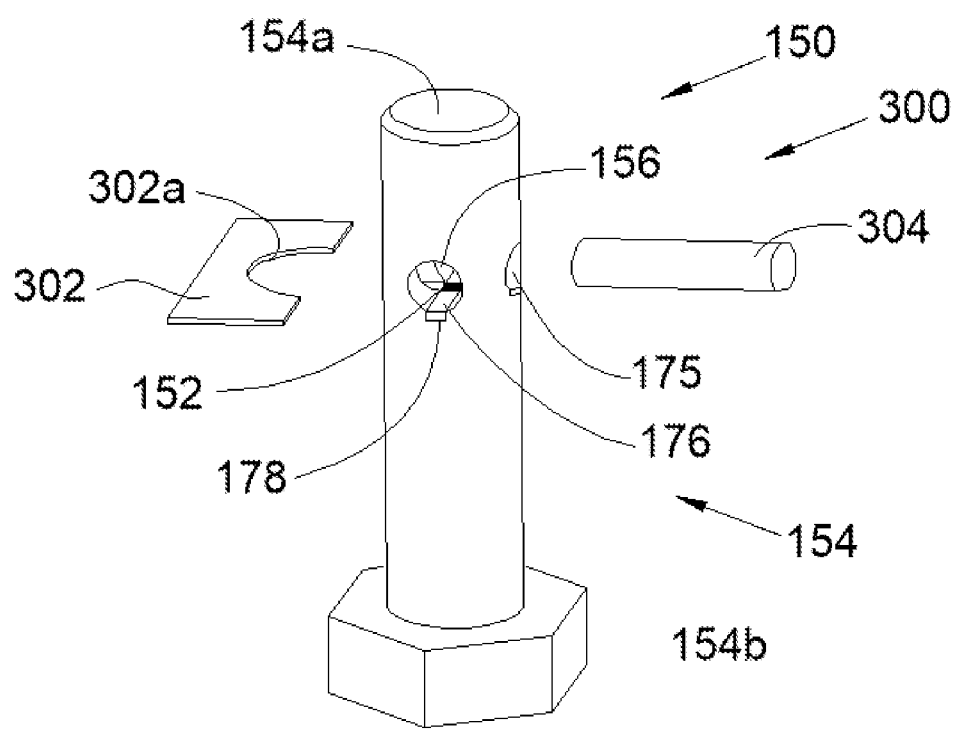
FIG. 3 is a perspective view of the probe according to the first embodiment of the invention.

FIGS. 1 to 3 show an assembly 100 with a probe 150 according to a first embodiment of the invention, and FIGS. 4 to 7 show an assembly 200 with a probe 250 according to a second embodiment of the invention. Each of these embodiments makes it possible to check the presence of paramagnetic particles in a tank without having to entirely drain said tank and also to assess the wear of the mechanical parts from which the paramagnetic particles originate. As is presented hereinbelow, the probe 150 constitutes a plug for a tank 102, 202 and this plug comprises means for performing probing inside the tank 102, 202.

The assembly 100, 200 comprises a tank 102, 202 having a wall 104, 204 pierced by an orifice 106, 206 and in which the tank 102, 202 is intended to contain a fluid 50. The fluid 50 is for example oil which ensures the lubrication of the moving metal parts which are housed in the tank, such as, for example, the meshings of a gearbox, and which are bathed in the fluid 50. Through wear, the metal parts release paramagnetic particles 52.

The assembly 100, 200 also comprises the probe 150, 250 which bears a magnet 152, 252.

The probe 150, 250 also comprises a displacement system 154, 254 which is arranged at the orifice 106, 206 and which is constructed to displace the magnet 152, 252 from a capturing position (FIG. 1, FIG. 4) in which the magnet 152, 252 is bathed in the fluid 50 in such a way that at least some of the paramagnetic particles 52 are fixed to said magnet 152, 252, to a checking position (FIG. 2, FIG. 6) in which the magnet 152, 252 is not bathed in the fluid 50 and is outside of the tank 102, 202 to be visible with the paramagnetic particles 52 which are fixed to it from the outside of the tank 102, 202, and vice versa.

The probe 150, 250 also comprises sealing means 170, 270 which are arranged to ensure the seal-tightness of the orifice 106, 206 in the transition from the capturing position to the checking position and vice versa. Thus, the transition from the capturing position to the checking position and vice versa is such that the tank 102, 202 is not entirely drained of the fluid 50 and, more particularly, it is drained to a very limited extent in the two embodiments as is explained hereinbelow.

The sealing means 170, 270 also ensure the seal-tightness of the orifice 106, 206 with respect to the tank 102, 202 for all positions between the capturing position and the checking position and in the capturing position and the checking position.

Thus, it is possible to know the state of contamination of the fluid 50 without having to drain the tank 102, 202, hence a time saving, and reduced consumption of the fluid 50.

Figure 4:
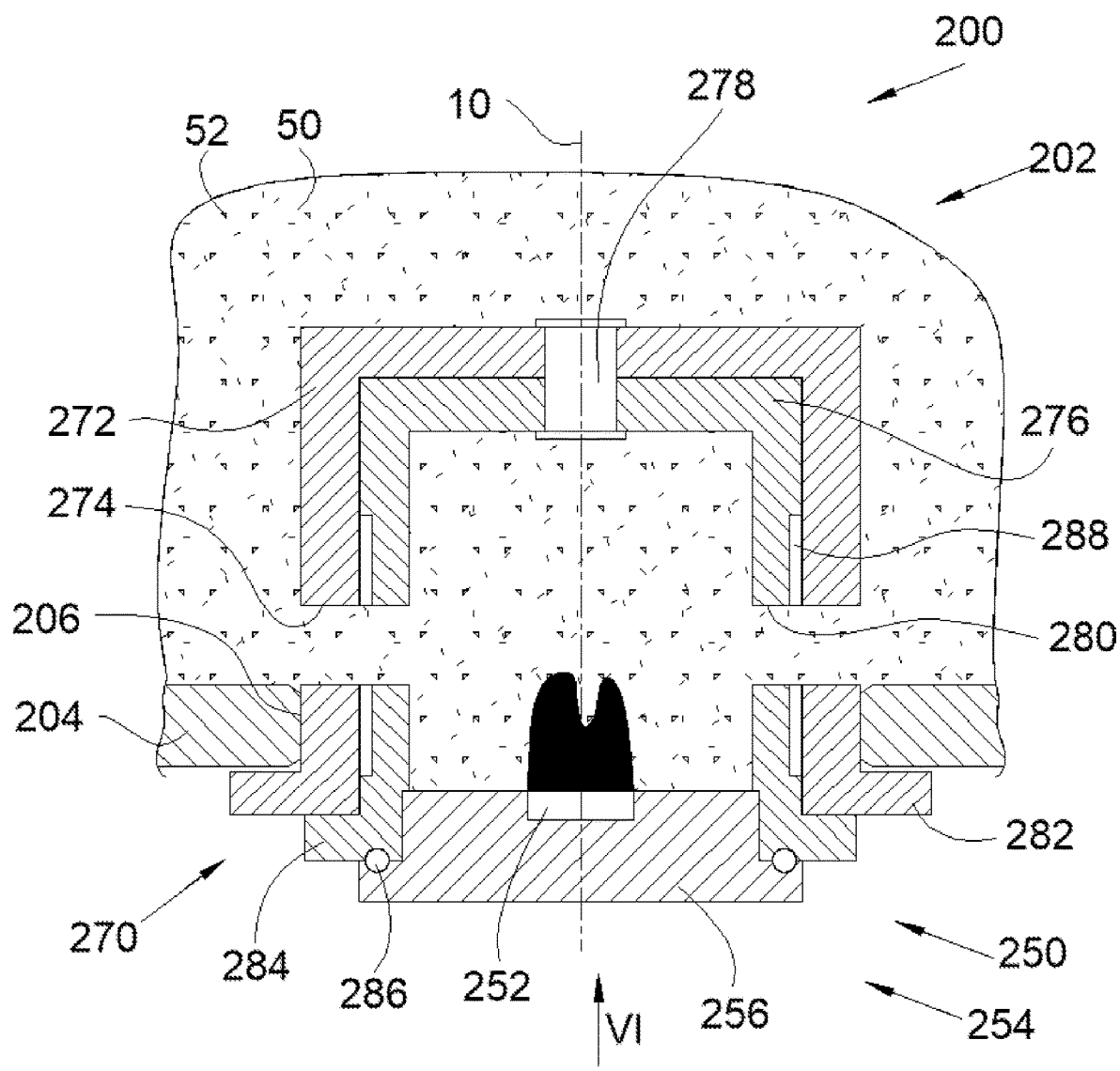
FIG. 4 is a cross-sectional view of an assembly with a probe according to a second embodiment of the invention in a capturing position of the probe.

In the two embodiments presented in FIGS. 1 and 4, the orifice 106, 206 is in a bottom wall of the tank 102, 202 because it can also serve as a draining orifice for entirely draining the fluid 50 if required, however, the orifice 106, 206 can also be produced in another wall of the tank 102, 202, provided that the magnet 152, 252 is bathed in the fluid 50 in capturing position.

In the first embodiment of the invention, the displacement system 154 is constructed to displace the magnet 152 through the orifice 106 from the inside to the outside of the tank 102 and vice versa, and the sealing means 170 are arranged to ensure the seal-tightness at the orifice 106 when the magnet 152 passes through it. The capturing position corresponds to the magnet 152 inside the tank 102 and the checking position corresponds to the magnet 152 outside of the tank 102.

The displacement system 154 takes the form of a screw with a threaded rod 154a and a head 154b and the orifice 106 is a tapped hole into which the threaded rod 154a is screwed. The head 154b remains outside of the tank 102.

The threaded rod 154a has at least one recess 156 in each of which a magnet 152 is fixed to the threaded rod 154a. In the embodiment of the invention presented here, the recess 156 passes completely through the threaded rod 154a.

The position of the recess 156 along the threaded rod 154a is such that the magnet 152 is bathed in the fluid 50 in capturing position and is outside of the tank 102 in checking position. The transition from the capturing position to the checking position entails unscrewing the screw, and, conversely, the transition from the checking position to the capturing position entails screwing in the screw.

Thus, the fluid 50 spills into the recess 156 and at least some of the paramagnetic particles 52 are fixed to the magnet 152.

In checking position, the screw is not entirely unscrewed and the threaded rod 154a remains engaged in the orifice 106 to avoid leaks of fluid 50. Only the fluid 50 present in the recess 156 is removed from the tank 102, which represents a very small quantity which can be easily compensated by a subsequent topping-up at a lower cost compared to the state of the art.

When the orifice 106 also constitutes the draining orifice, the threaded rod 154a is entirely removed to allow the fluid 50 to flow.

The sealing means 170 are produced by the threading of the threaded rod 154a and the tapping of the orifice 106 which cooperate to ensure the seal-tightness. Preferentially, for a better seal-tightness in checking position, the position of the recess 156 is such that, in checking position, the threaded rod 154a remains engaged with the orifice 106 over the entire depth of the latter.

In the embodiment of the invention presented in FIG. 1, the seal-tightness is completed by a seal 172, for example of O-ring seal type, which is disposed between the head 154b and the wall 104 and around the orifice 106.

According to a particular embodiment, the screw is produced in a non-magnetic material, thus the paramagnetic particles 52 do not become fixed onto the threaded rod 154a and in particular they are not fixed onto the threading.

FIG. 3 shows a particular embodiment, in which the screw can be produced in a paramagnetic material, and, to avoid the magnetization of the threaded rod 154a because of the presence of the magnet 152 which is fixed to it, elements 176 produced in a non-magnetic material are disposed and fixed between the magnet 152 and the threading of the threaded rod 154a. Obviously, to be able to capture the paramagnetic particles 52, at least one face of the magnet 152 remains free, i.e. it is in contact neither with the threaded rod 154a nor with an element 176.

The recess 156 takes the form of at least one tunnel 175 emerging at each end at the threading of the threaded rod 154a. Here, there are two tunnels 175 in cross formation. Each tunnel 175 has a drain 178 extending along said tunnel 175 and the magnet 152 is housed in the drain 178 at a distance from the threading; here, the magnet 152 is housed at the intersection of the two drains 178. For each part of a drain 178 extending between the magnet 152 and the threading of the threaded rod 154a, an element 176 produced in a non-magnetic material, here a bar, is housed in said part in the extension of the magnet 152 to the end of the corresponding tunnel 175 which emerges at the threading of the threaded rod 154a.

Here, the magnet 152 has a free face which is flush with the surface of the elements 176.

FIG. 3 also shows a tool 300 which makes it possible to recover the paramagnetic particles 52 which are linked to the magnet 152. The tool 300 comprises a receptacle 302 having a cutout 302a whose form complements the form of the threaded rod 154a, i.e., a cutout in the form of a circular arc. The tool 300 also comprises a piston 304 whose form is matched to the form of the recess 156.

Recovering the paramagnetic particles 52 entails placing the receptacle 302 against the threaded rod 154a at one end of the recess 156 and introducing the piston 304 through the other end of the recess 156 by displacing it towards the receptacle 302 by rubbing against the magnet 152 to recover the paramagnetic particles 52 which are then recovered in the receptacle.

It is then possible to analyse the quantity of paramagnetic particles 52 and, depending on this quantity, to decide whether or not to perform a complete draining of the tank 102.

In the second embodiment of the invention, the displacement system 254 is constructed to displace the magnet 252 between the capturing position (FIG. 4) in which the magnet 252 is in contact with the fluid 50 through the orifice 206 and the checking position (FIG. 6) in which the magnet 252 is not in contact with the fluid 50 and vice versa.

In the second embodiment of the invention, the sealing means 270 take the form of a double bell-housing system mounted at the orifice 206.

The sealing means 270 comprise an outer bell-housing which takes the form of a first blind cylinder 272 which has an open end which is mounted fixed in the orifice 206 for example by screwing and a blind end dipping into the fluid 50. The part of the cylindrical wall of the first blind cylinder 272 which is dipped into the fluid 50 is pierced by first passages 274 through which the fluid 50 can pass. As FIG. 7 shows, there are several first passages 274 at a distance from one another and separated by solid parts of the cylindrical wall of the first blind cylinder 272. In the embodiment of the invention presented in FIGS. 4 to 6, the open end of the first blind cylinder 272 has a first shoulder 282 which comes to bear against an outer face of the wall 204 of the tank 202.

The sealing means 270 comprise an inner bell-housing which takes the form of a second blind cylinder 276 which is mounted to be movable in rotation inside the first blind cylinder 272. The second blind cylinder 276 has an open end which is disposed at the open end of the first blind cylinder 272 and a blind end disposed against the blind end of the first blind cylinder 272. In the embodiment of the invention presented in FIGS. 4 to 6, the open end of the second blind cylinder 276 has a second shoulder 284 which comes to bear against the cylindrical wall of the first blind cylinder 272 at its open end.

The axis of each blind cylinder 272, 276 is, here, coaxial with a same axis 10 which is at right angles to the plane in which the orifice 206 lies and which constitutes the axis of rotation of the second blind cylinder 276.

The pivot link between the first blind cylinder 272 and the second blind cylinder 276 is produced here by an axis 278 passing through the two blind ends and which is coaxial with the axis 10.

The cylindrical wall of the second blind cylinder 276 is also pierced by second passages 280 through which the fluid 50 can pass. As FIG. 7 shows, there are several second passages 280 at a distance from one another and separated by solid parts of the cylindrical wall of the second blind cylinder 276.

The first passages 274 and the second passages 280 are disposed in such a way that, in capturing position (FIG. 4), a second passage 280 is facing a first passage 274 to create a corridor through which the fluid 50 and the paramagnetic particles 52 pass to reach the inside of the second blind cylinder 276 and in such a way that, in checking position (FIG. 6), each second passage 280 is located facing a solid part of the cylindrical wall of the first blind cylinder 272 and each first passage 274 is located facing a solid part of the cylindrical wall of the second blind cylinder 276 in order to close the corridor and stop the flow of the fluid 50 to the inside of the second blind cylinder 276.

In the second embodiment of the invention, the displacement system 254 takes the form of a plug 256 which is screwed to the second blind cylinder 276 at its open end and in which the magnet 252 is fixed to a face of the plug 256 oriented towards the inside of the second blind cylinder 276. The plug 256 can be removed to give access to the magnet 252.

Figure 5:
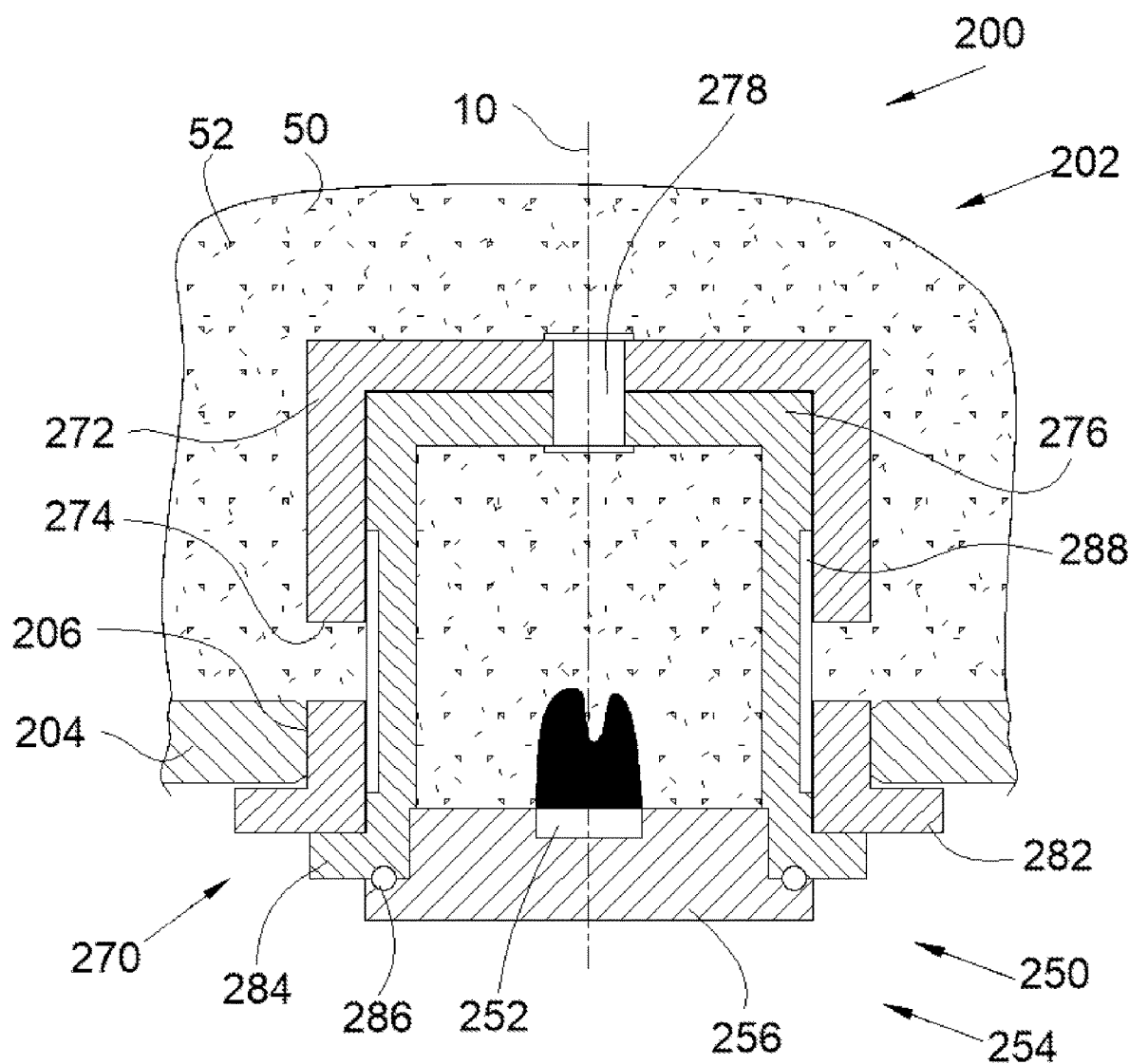
FIG. 5 is a cross-sectional view of the assembly of FIG. 4 in a position of isolation of the probe.

FIG. 5 shows an intermediate position between the capturing position and the checking position. The intermediate position corresponds to a position of isolation, in which the flow of the fluid 50 through the passages 274 and 280 is stopped and in which the plug 256 has not yet been removed.

Thus, starting from the capturing position (FIG. 4), the fluid 50 and the paramagnetic particles 52 enter into the second blind cylinder 276 and the paramagnetic particles 52 are fixed to the magnet 252. By transitioning to the position of isolation (FIG. 5), the fluid 50 can no longer enter into the second blind cylinder 276. It is then possible to transition to the checking position (FIG. 6) by removing the plug 256 and it is then possible to analyse the quantity of paramagnetic particles 52 and, depending on this quantity, decide whether or not to perform a complete draining of the tank 202. The transition from one position to another is done by rotation of the second blind cylinder 276 with respect to the first blind cylinder 272. Reverse routing makes it possible to revert to the capturing position.

In this embodiment, only the fluid 50 present in the second blind cylinder 276 is removed from the tank 202, which represents a very small quantity which can be easily compensated by a subsequent topping-up at a lower cost compared to the state of the art.

Figure 6:
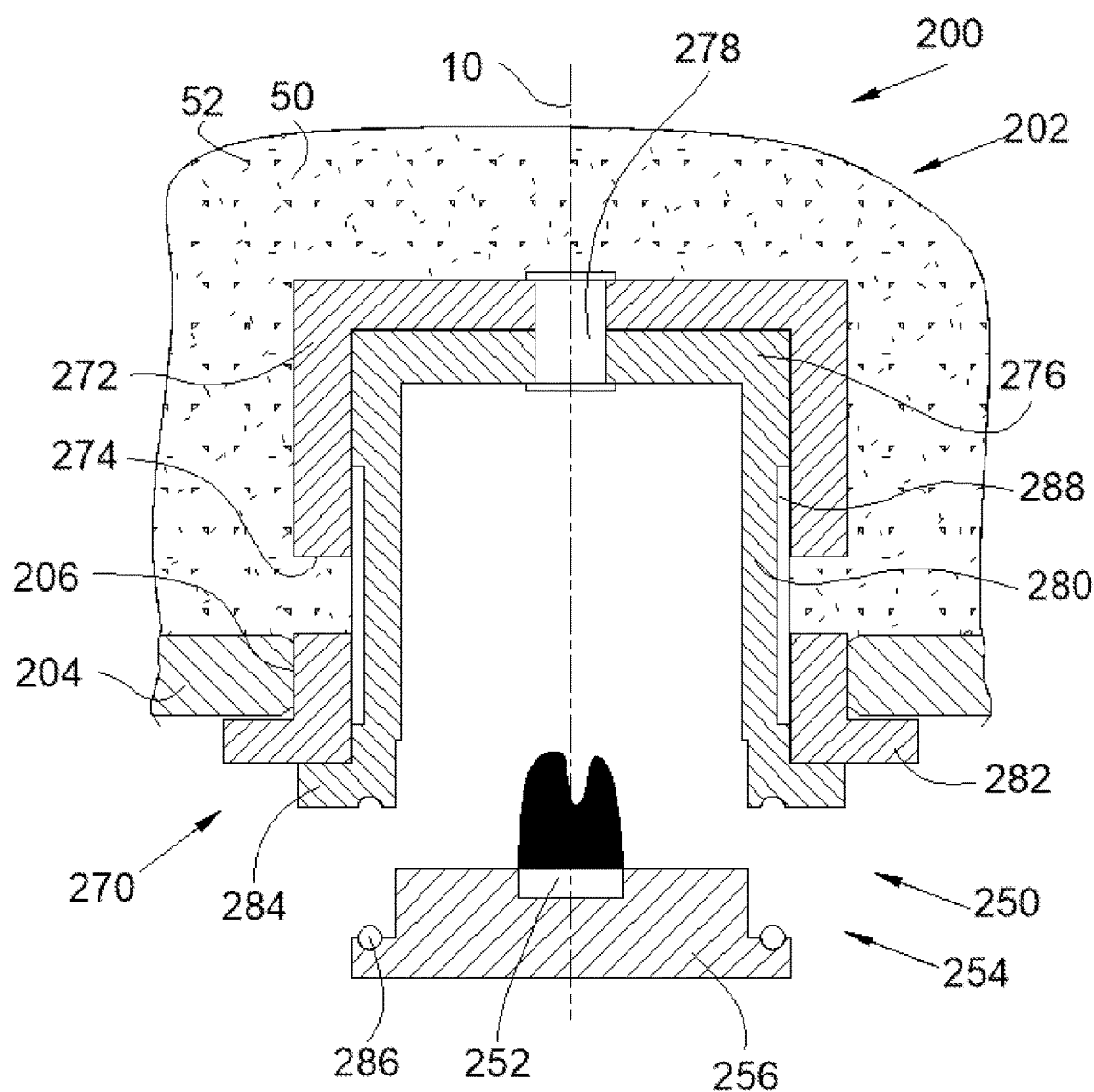
FIG. 6 is a cross-sectional view of the assembly of FIG. 4 in a checking position of the probe.
Figure 7:
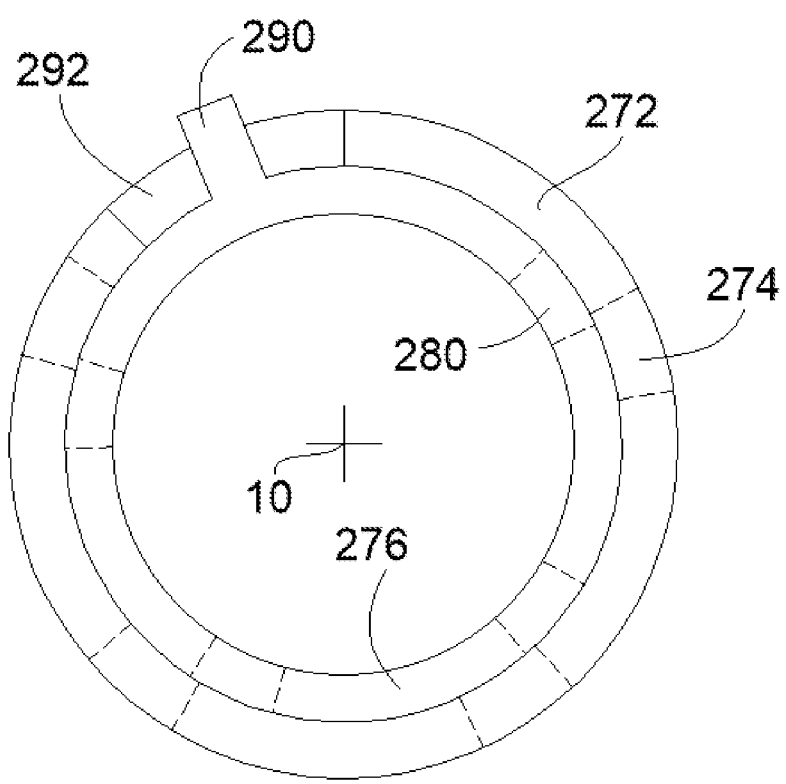
FIG. 7 is a view according to the arrow VII of FIG. 4 in an intermediate position of the probe between the capturing position and the position of isolation.

In the embodiment of the invention presented in FIGS. 4 to 6, a seal 286, for example of O-ring seal type, is disposed between the plug 256 and the second blind cylinder 276.

In the embodiment of the invention presented in FIGS. 4 to 6, for each first passage 274, the second blind cylinder 276 bears a seal 288 which is fixed to the solid part of the cylindrical wall of the second blind cylinder 276 which comes to face the first passage 274 in checking position. This seal 288 takes the form of a flexible element, for example of silicone or rubber type, which is compressed between the first blind cylinder 272 and the second blind cylinder 276. There can be a seal 288 for each first passage 274 fixed to the second blind cylinder 276 or a single seal 288 of cylindrical form threaded around the second blind cylinder 276 and cut facing each second passage 280.

FIG. 7 shows an intermediate position between the capturing position and the position of isolation since the first passages 274 and the second passages 280 are partially aligned.

In this embodiment, the second blind cylinder 276 has a handle 290 which is mounted to be movable in a notch 292 formed in the first blind cylinder 272. The notch 292 extends radially between two limits embodying the capturing position and the position of isolation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A probe for use with a tank having a wall pierced by an orifice and wherein the tank is configured to contain a fluid containing paramagnetic particles, said probe comprising:
   a magnet,
      a displacement system configured to be arranged at the orifice and to displace the magnet from a capturing position in which the magnet is bathed in the fluid to a checking position in which the magnet is outside of the tank, and
   sealing means configured to provide a seal-tightness of the orifice in a transition from the capturing position to the checking position and from the checking position to the capturing position,
   wherein the sealing means comprise:
      a first blind cylinder with an open end configured to be fixedly mounted in the orifice and a blind end configured to dip into the fluid, wherein a part of a cylindrical wall of the first blind cylinder which is configured to dip into the fluid is pierced by first passages separated by solid parts of the cylindrical wall of the first blind cylinder, and
      a second blind cylinder having an open end disposed at the open end of the first blind cylinder and a blind end disposed against the blind end of the first blind cylinder, wherein the second blind cylinder is rotatably mounted inside the first blind cylinder, wherein a cylindrical wall of the second blind cylinder is pierced by second passages separated by solid parts of the cylindrical wall of the second blind cylinder,
      wherein the first passages and the second passages are disposed in such a way that, in the capturing position, a second passage is facing a first passage and in such a way that, in the checking position, each second passage is located facing a solid part of the cylindrical wall of the first blind cylinder and each first passage is located facing a solid part of the cylindrical wall of the second blind cylinder, and
      wherein the displacement system comprises a plug which is screwed to the second blind cylinder at the open end and wherein the magnet is fixed to a face of the plug oriented towards an inside of the second blind cylinder.

2. The probe according to claim 1, wherein for each first passage, the second blind cylinder bears a seal fixed to the solid part of the cylindrical wall of the second blind cylinder which comes to face the first passage in the checking position.

3. An assembly comprising:
   a tank having a wall pierced by an orifice and wherein the tank is configured to contain a fluid containing paramagnetic particles,
   and the probe according to claim 1, wherein the displacement system is arranged at the orifice.

* * * * *